United States Patent
Girelli Consolaro et al.

(10) Patent No.: US 9,061,563 B2
(45) Date of Patent: Jun. 23, 2015

(54) VEHICLE HAVING A TRANSVERSE LEAF SPRING WHEEL SUSPENSION

(71) Applicants: Ford Global Technologies, LLC, Dearborn, MI (US); Magna Steyr Fahrzeugtechnik AG and CoKG, Graz Sturia (AT)

(72) Inventors: Alberto Girelli Consolaro, Aachen (DE); Marc Simon, Köln (DE); Paul Zandbergen, Montzen (BE); Thomas Gerhards, Niederzier (DE); Walter Shimpl, Graz (AT)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 14/057,097

(22) Filed: Oct. 18, 2013

(65) Prior Publication Data

US 2014/0175767 A1    Jun. 26, 2014

(51) Int. Cl.
| | |
|---|---|
| *B60G 11/10* | (2006.01) |
| *B60G 11/08* | (2006.01) |
| *B60G 11/12* | (2006.01) |
| *B60G 21/05* | (2006.01) |
| *B60G 11/36* | (2006.01) |

(52) U.S. Cl.
CPC ............... *B60G 11/08* (2013.01); *B60G 11/10* (2013.01); *B60G 11/12* (2013.01); *B60G 21/05* (2013.01); *B60G 11/36* (2013.01); *B60G 2202/114* (2013.01); *B60G 2204/121* (2013.01); *B60G 2206/428* (2013.01)

(58) Field of Classification Search
CPC ...... B60G 11/08; B60G 11/113; B60G 11/12; B60G 21/026; B60G 2204/4302; F16F 1/182; F16F 1/30; F16F 1/26; F16F 1/28; F16F 1/3686; F16F 1/3683

USPC ............... 280/124.109, 124.121, 124.116, 280/124.117, 124.17, 124.174, 124.177
See application file for complete search history.

(56) References Cited

U.S. PATENT DOCUMENTS

| | | | | |
|---|---|---|---|---|
| 3,093,391 | A | * | 6/1963 | Rothweiler ............ 280/124.109 |
| 4,869,472 | A | * | 9/1989 | de Goncourt ................... 267/52 |
| 5,016,861 | A | | 5/1991 | Thompson et al. |
| 5,141,209 | A | * | 8/1992 | Sano et al. .................... 267/36.1 |
| 5,251,930 | A | * | 10/1993 | Kusaka et al. ........... 280/124.14 |
| 5,826,896 | A | | 10/1998 | Baumann |
| 6,029,987 | A | | 2/2000 | Hoffman et al. |
| 6,189,904 | B1 | | 2/2001 | Gentry et al. |

(Continued)

FOREIGN PATENT DOCUMENTS

| | | |
|---|---|---|
| DE | 19721878 A1 | 12/1998 |
| DE | 102008052756 A1 | 4/2010 |

*Primary Examiner* — Paul N Dickson
*Assistant Examiner* — Darlene P Condra
(74) *Attorney, Agent, or Firm* — Burgess Law Office, PLLC; Raymond L. Coppiellie

(57) ABSTRACT

The invention relates to a wheel suspension for a vehicle, in particular a motor vehicle, having a transverse leaf spring arranged transversely relative to a vehicle longitudinal axis. The transverse leaf spring is supported at each of the two sides of a vehicle longitudinal center plane by at least one resilient member on a vehicle-side support which is securely connected to the vehicle superstructure or an auxiliary frame which is connected to the vehicle superstructure. The resilient member and the support form an articulated engagement. With an articulated engagement provided at each side of the vehicle longitudinal center plane.

8 Claims, 4 Drawing Sheets

(56) References Cited

U.S. PATENT DOCUMENTS

| | | |
|---|---|---|
| 7,722,065 B2 * | 5/2010 | Platner et al. .......... 280/124.175 |
| 2004/0004336 A1 | 1/2004 | Zandbergen et al. |
| 2005/0051933 A1 * | 3/2005 | Platner et al. ................... 267/38 |
| 2008/0048408 A1 * | 2/2008 | Reineck ................ 280/124.104 |
| 2012/0098229 A1 * | 4/2012 | Hochapfel et al. ..... 280/124.134 |
| 2012/0161411 A1 * | 6/2012 | Ehrlich et al. ........... 280/124.17 |
| 2012/0286492 A1 * | 11/2012 | Sjoesten et al. ........ 280/124.101 |
| 2013/0099462 A1 * | 4/2013 | Ehrlich et al. ......... 280/124.116 |
| 2013/0154227 A1 | 6/2013 | Lindtner |

* cited by examiner

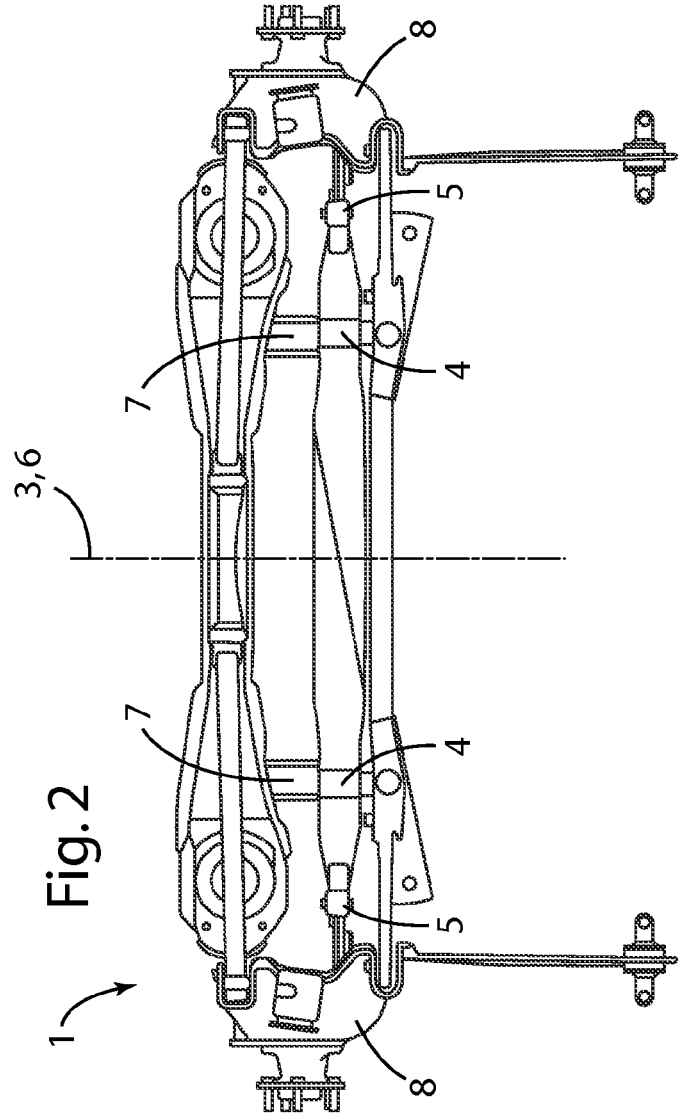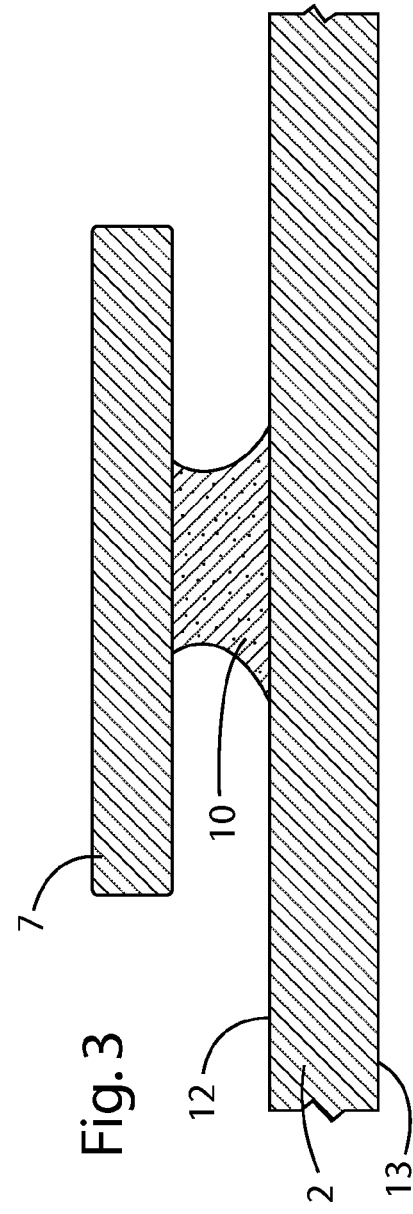

VEHICLE HAVING A TRANSVERSE LEAF SPRING WHEEL SUSPENSION

CROSS-REFERENCE TO RELATED APPLICATIONS

Not Applicable.

BACKGROUND OF THE INVENTION

1. Field of the Invention

The present invention generally relates to a wheel suspension for a vehicle; and more specifically to a motor vehicle having a transverse leaf spring arranged transversely relative to a vehicle longitudinal axis.

2. Description of Related Art

Transverse leaf springs may be used in vehicle wheel suspensions as an efficient solution for weight reduction as they replace the superstructure springs and the stabilizer. In order to function as the superstructure springs and the stabilizer the leaf springs must be able to ensure, at the same time, a degree of rolling stability (resistance against mutually opposing vertical movement of the wheels) and a degree of lifting stability (resistance against vertical movement of the wheels in the same direction). Typically, these levels of rigidity are different. The transverse leaf spring, with a resiliently loaded mass, such as for example the vehicle superstructure or an auxiliary frame which is connected to the vehicle superstructure, must be secured at two different inner articulation locations with a specific lateral spacing with respect to each other. The outer ends or outer articulation locations of the transverse leaf springs are connected to the non-resiliently loaded mass of the vehicle, for example, the wheels, wheel carriers, brakes, components of the wheel suspension, etc. In this manner, a four-point bending system is defined.

The structure of the inner articulation locations is generally rather complex since they must comply at the same time with various requirements. For instance, a high level of vertical rigidity is desirable since vertical resilience of the inner articulation locations influences the resulting rolling and lifting rigidity. In particular, a lower level of vertical rigidity leads to a lower relationship between rolling and lifting rigidity, which is, however, undesirable. A large relationship between rolling and lifting rigidity ensures that the wheel suspension provides a high level of resistance against rolling movements of the vehicle superstructure while, at the same time, providing adequate resilience in a vertical movement direction for good travel comfort.

A low lateral rigidity of the inner articulation locations is further desirable in order to enable a deformation of the central portion of the transverse leaf spring during the lifting and rolling movements of the vehicle. Such deformations of the transverse leaf spring require that the lateral spacing between the inner articulation locations be able to change. Furthermore, a low torsion rigidity of the inner articulation locations is also desirable in order on one hand to enable the deformations in the central portion thereof and on the other hand to prevent the bearing rigidity of the inner articulation locations making a significant contribution to the overall rolling and lifting rigidity of the transverse leaf spring-parasitic contribution.

SUMMARY OF THE INVENTION

In order to prevent a deterioration of the dynamic vehicle behavior, the inner articulation locations are intended to be constructed with low friction and low hysteresis. Other objectives with regard to the construction of the inner articulation locations further include low costs, low weight, protection from contamination, the ability to resist high temperatures, moisture and chemical materials, etc., and taking into account spatial provisions.

According to the invention, a wheel suspension for a vehicle includes a transverse leaf spring which is arranged transversely relative to a vehicle longitudinal axis and which is supported at each of the two sides of a vehicle longitudinal center plane by at least one resilient member on a vehicle-side support which is securely connected to the vehicle superstructure or an auxiliary frame which is connected to the vehicle superstructure. The resilient member and the support each form an articulated engagement, with an articulated engagement being provided on each of the two sides of the vehicle longitudinal center plane.

The invention provides in one embodiment a considerably simplified bearing for the transverse leaf springs on the vehicle superstructure or the auxiliary frame. Both a saving in terms of weight and cost advantages can thereby be achieved during the production and the assembly. Furthermore, the wheel suspension according to the invention ensures a movement of the transverse leaf spring during travel operation at the articulation locations or bearings without significant levels of resistance since as an articulated engagement is provided at both sides of the vehicle longitudinal center plane. Consequently, the transverse leaf spring is supported on the vehicle superstructure or the auxiliary frame with two articulated engagements.

For particularly low-resistance bearing of the transverse leaf spring on the vehicle superstructure, an embodiment of the invention makes provision for the articulated engagement to have at least one pivot axis, which extends parallel with a main bending axis of the transverse leaf spring.

According to another embodiment of the invention, the support is at least one semi-oval or semi-cylindrical pin, the longitudinal side of which the resilient member abuts in a positive-locking or materially integral manner, for example, by adhesive bonding or vulcanization. The pin securely connected to the vehicle superstructure is, in comparison with the material of the resilient member, formed from a rigid or a hard material. This embodiment affords the substantial advantage of a particularly simple structure of the articulated engagement, which is distinguished in particular by the use of the smallest possible number of components and which consequently provides a particularly light and cost-effective solution. The pin which is formed from the hard material further ensures a desirably high level of vertical rigidity of the articulated engagement, while the resilience of the articulated engagement in the lateral direction and in the rotation direction can be predetermined by the special configuration of the resilient member. In this manner, the desired dynamic behavior of the wheel suspension may be influenced in the desired manner by the bearing of the transverse leaf spring on the vehicle superstructure or on the auxiliary frame.

Another embodiment of the invention makes provision for the support to be an oval or a cylindrical pin which is completely received in a corresponding recess of the resilient member in a positive-locking or materially integral manner, for example, by adhesive bonding or vulcanization. As previously described, the pin is formed from a material which is hard in comparison to the resilient member. This embodiment provides, with respect to the previously described advantages, the additional advantage that the articulated engagement can follow the movements of the transverse leaf spring during travel operation more easily, that is to say, with less resistance. Since the resilient member can rotate substantially freely about the received pin, the resilient member is subjected to fewer deformations during the movements of the transverse leaf spring during travel operation. The hysteresis of the wheel suspension according to the invention can thereby be generally reduced.

In order to further reduce the friction between the resilient member and the pin, an advantageous embodiment of the invention makes provision for there to be inserted into the recess of the resilient member a bushing in which the oval or cylindrical pin is received. The hysteresis of the wheel suspension according to the invention can thereby be reduced again.

According to another embodiment of the invention, the resilient member is connected to the transverse leaf spring in a materially integral manner, for example, by adhesive bonding or vulcanization. In this manner, the resilient member and the transverse leaf spring are effectively prevented from being able to become separated in the event of movements during travel operation. Furthermore, it is possible to dispense with the use of a retention device, such as, for example, bearing shells, securing clamps and the like, in order to connect the resilient member to the transverse leaf spring, whereby further weight and cost advantages can be achieved with the wheel suspension according to the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a bottom view of the wheel suspension from FIG. 1, FIG. 3 is a sectioned view through the inner articulation location of the transverse leaf spring from FIG. 1.

DETAILED DESCRIPTION OF THE PREFERRED EMBODIMENTS

The following description of the preferred embodiment(s) is merely exemplary in nature and is in no way intended to limit the invention, its application, or uses.

An articulated engagement in the context of the present invention is intended to be understood to refer to an engagement between the resilient member and the support which enables a pivot movement about at least one pivot axis between these two elements.

Figure 1:
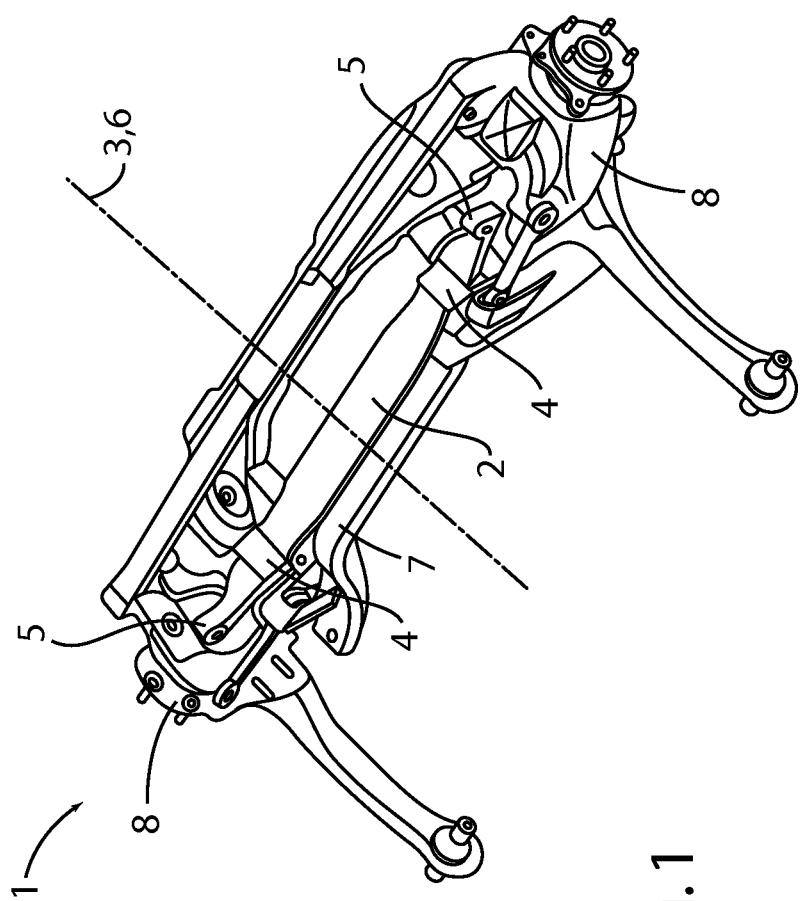
FIG. 1 is a perspective view from below of a first embodiment of a wheel suspension according to the invention having a transverse leaf spring.

FIG. 1 is a perspective view from below of a first embodiment of a wheel suspension 1 according to the invention having a transverse leaf spring 2 for an axle of a vehicle, in particular a motor vehicle. FIG. 2 is a bottom view of the same transverse leaf spring 2. The transverse leaf spring 2 which is preferably a transverse leaf spring produced from a composite glass-fiber material (composite transverse leaf spring) is arranged transversely relative to a vehicle longitudinal axis 3. As can be seen from FIGS. 1 and 2, the transverse leaf spring 2 has two inner, laterally spaced-apart articulation locations 4 or inner bearings 4 and two outer articulation locations 5 or outer bearings 5 at the free ends of the transverse leaf spring 2. The inner and outer articulation locations 4 and 5 are arranged at each of the two sides of a vehicle longitudinal center plane 6. The inner articulation locations 4 support the transverse leaf spring 2 on the vehicle superstructure or on an auxiliary frame 7 connected to the vehicle superstructure. The outer articulation locations 5 of the transverse leaf spring 2 are each connected to a wheel carrier 8.

FIG. 3 illustrates one embodiment of a transverse leaf spring 2 supported in the inner articulation locations 4 by of at least one resilient member 10, for example a rubber member, on a vehicle-side support, which is securely connected to the vehicle superstructure or the auxiliary frame 7 which is connected to the vehicle superstructure. The resilient member 10 and the vehicle-side support in this instance form an articulated engagement. This articulated engagement enables, according to the invention, a pivot movement of the two elements which are in engagement about at least one pivot axis. Preferably, the articulated engagement has at least one pivot axis, which extends parallel with a main bending axis of the transverse leaf spring 2. The main bending axis of the transverse leaf spring 2 further extends in the embodiment of the wheel suspension 1 according to the invention shown in FIGS. 1 and 2 parallel with the vehicle longitudinal axis 3. According to the present invention one such articulated engagement is provided at each of the two sides of the vehicle longitudinal center plane 6. That is to say, an inner articulation location 4 provides precisely one articulated engagement between the resilient member 10 and the vehicle-side support.

Figure 4:
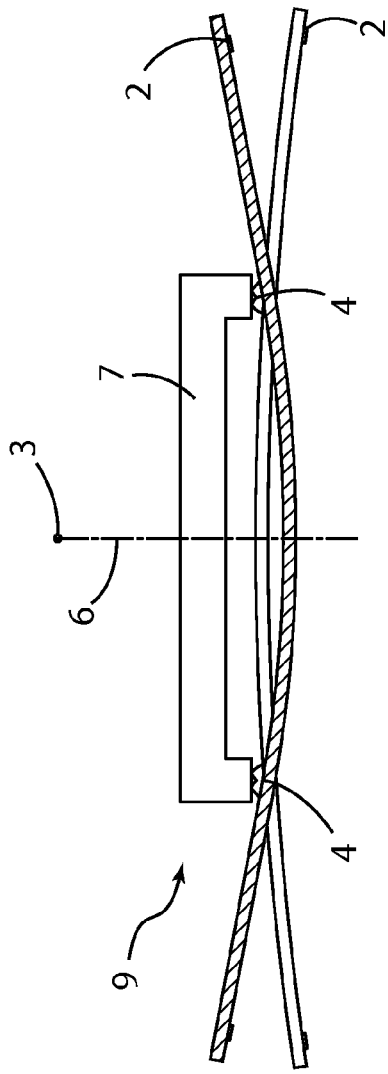
FIG. 4 is a schematic rear view of a second embodiment of a wheel suspension according to the invention having a transverse leaf spring.

FIG. 4 is a schematic rear view of a second embodiment of a wheel suspension 9 according to the invention having a transverse leaf spring 2 which is arranged transversely relative to a vehicle longitudinal axis 3. In one example the transverse leaf spring 2 can be made from a composite glass-fiber material (composite transverse leaf spring). As already described, the transverse leaf spring 2 is supported by two inner articulation locations 4 on the vehicle superstructure or on the auxiliary frame 7 which is connected to the vehicle superstructure. FIG. 4 additionally illustrates the transverse leaf spring 2 in two movement states, as can be assumed by the transverse leaf spring 2 during the travel operation.

Figure 5:
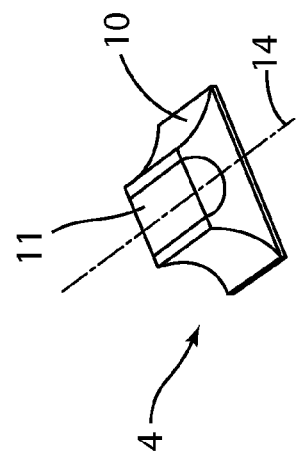
FIG. 5 is an enlarged perspective view of an inner articulation location of the transverse leaf spring from FIG. 4.
Figure 6:
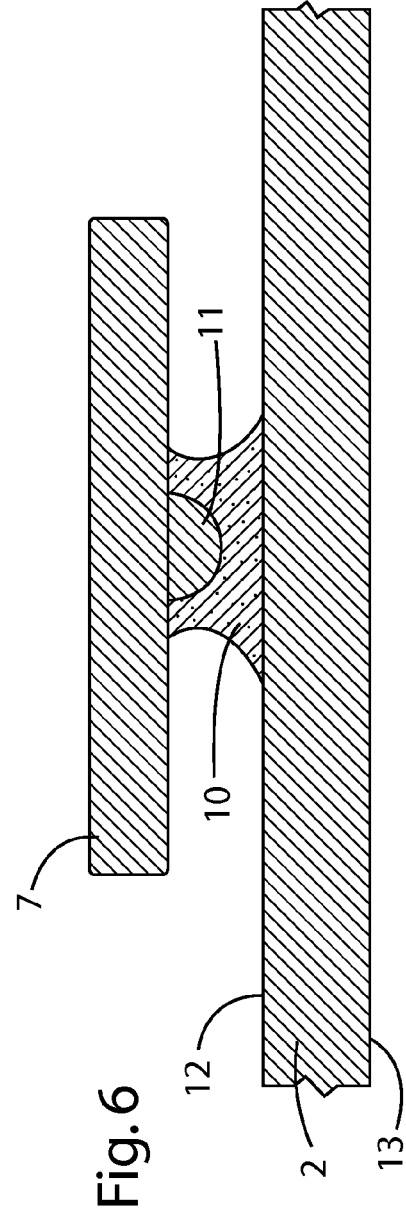
FIG. 6 is a sectioned view through the inner articulation location of the transverse leaf spring from FIG. 4.

FIG. 5 is an enlarged perspective view of an inner articulation location 4, including a resilient member 10 used with the transverse leaf spring 2 from FIG. 4. FIG. 6 is a sectioned view through the inner articulation location 4 of the transverse leaf spring 2 from FIG. 4. The inner articulation locations 4 of the transverse leaf spring 2 from FIG. 4 substantially comprise a resilient member 10, for example, a rubber member, and a vehicle-side support 11. The vehicle-side support 11 is configured whereby it can be securely connected to the vehicle superstructure or to the auxiliary frame 7 which is connected to the vehicle superstructure. In the embodiment of the wheel suspension 9 according to the invention shown in FIG. 4, the resilient member 10 is preferably connected to the transverse leaf spring 2 in a materially integral manner, for example, by of adhesive bonding or vulcanization of the resilient member 10 to the transverse leaf spring 2. In the embodiment illustrated, the resilient member 10 is preferably arranged only at the upper side 12 of the transverse leaf spring 2 facing the support 11, as can be seen in FIG. 5. No resilient member 10 is arranged at the lower side 13 of the transverse leaf spring 2.

As seen in FIGS. 5 and 6, the embodiment of the wheel suspension 9, the vehicle-side support 11 is a semi-cylindrical pin, at the longitudinal side of which the resilient member 10 is in abutment in a positive-locking or materially integral manner. In this manner, the resilient member 10 and the semi-oval or semi-cylindrical pin 11 form the articulated engagement which enables a pivot movement of the two engaged elements 10 and 11 relative to each other. The pivot axis 14 of this articulated engagement extends parallel with the main bending axis of the transverse leaf spring 2 which, in the embodiment of the wheel suspension 9 according to the invention shown in FIG. 4, also extends parallel with the vehicle longitudinal axis 3. This embodiment of the articulated engagement affords the significant advantage of a particularly simple structure which is distinguished in particular by the use of the smallest possible number of components and consequently is a particularly light and cost-effective solution.

The semi-oval or semi-cylindrical pin 11 is securely connected to the vehicle superstructure or to the auxiliary frame 7 which is connected to the vehicle superstructure. The semi-oval or semi-cylindrical pin 11 is, in comparison with the material of the resilient member 10, formed from a rigid or hard material, such as, for example, steel, aluminum or another metal or a correspondingly hard plastics material. The pin 11 formed from the hard material ensures a desirably high level of vertical rigidity of the articulated engagement, whilst the resilience of the articulated engagement in a lateral direction and in a rotation direction can be predetermined by the specific configuration of the resilient member 10. Furthermore, the spacing of the pivot axis 14 with respect to the upper side 12 of the transverse leaf spring 2 can also be readily optimized by of corresponding configuration of the resilient member 10 taking into account the movements of the transverse leaf spring 2 occurring during travel operation. In this manner, the desired dynamic behavior of the wheel suspension 9 according to the invention can be influenced in the desired manner by the inner articulation locations 4 of the transverse leaf spring 2.

As can be seen in particular in FIG. 6, the semi-oval or semi-cylindrical pin 11 may be fitted directly to the vehicle superstructure or the auxiliary frame 7, that is to say, for example, may also be constructed integrally therewith.

Figure 7:
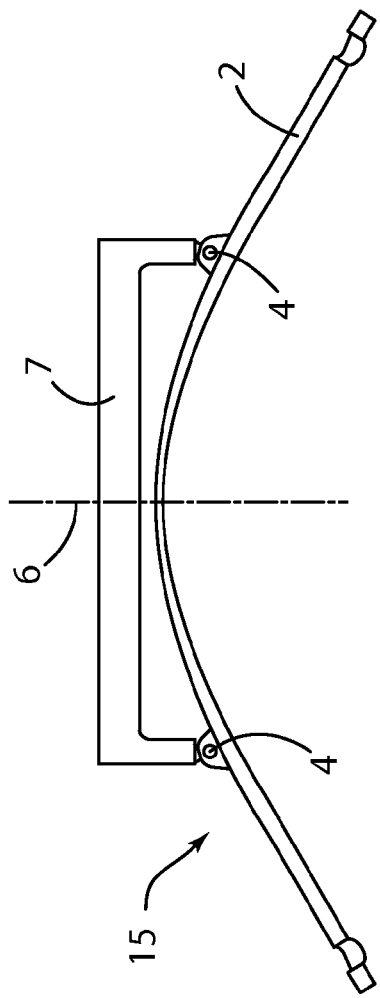
FIG. 7 is a schematic rear view of a third embodiment of a wheel suspension according to the invention having a transverse leaf spring.
Figure 8:
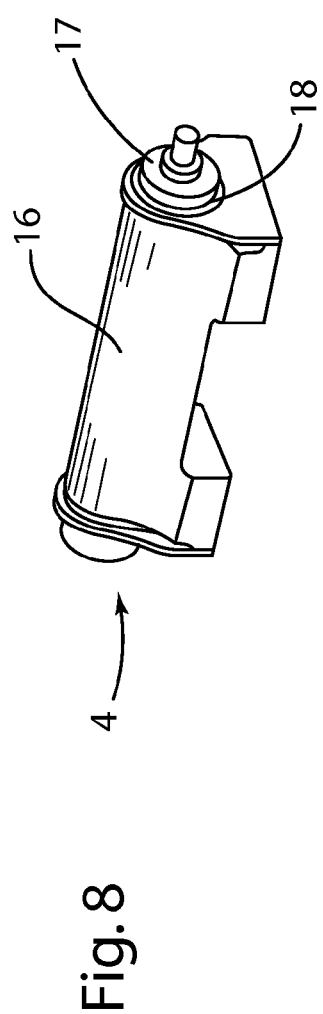
FIG. 8 is an enlarged perspective view of an inner articulation location of the transverse leaf spring from FIG. 7.
Figure 9:
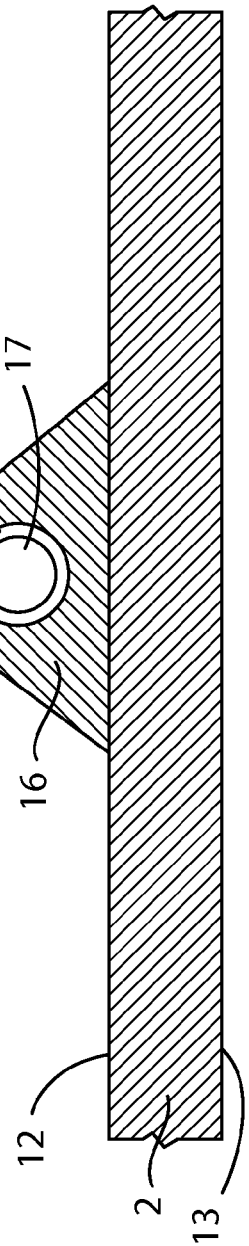
FIG. 9 is a sectioned view through the inner articulation location of the transverse leaf spring of FIG. 7.

FIGS. 7-9 illustrate a third embodiment of a wheel suspension 15 according to the invention having a transverse leaf spring 2 arranged transversely relative to a vehicle longitudinal axis 3. The transverse leaf spring 2 can be made from a composite glass-fiber material (composite transverse leaf spring) illustrated schematically in FIG. 7 from the rear. Again, the transverse leaf spring 2 is supported by two inner articulation locations 4 on the vehicle superstructure or on the auxiliary frame 7 which is connected to the vehicle superstructure.

FIG. 8 is an enlarged perspective view of an inner articulation location 4 of the transverse leaf spring 2 of FIG. 7. FIG. 9 is a sectioned view through the same inner articulation location 4 of the transverse leaf spring 2 of FIG. 7. The inner articulation location 4 of the transverse leaf spring 2 of FIG. 7 includes a resilient member 16, for example, a rubber member, and a vehicle-side support 17. The vehicle-side support 17 is securely connected to the vehicle superstructure or the auxiliary frame 7 which is connected to the vehicle superstructure. In the embodiment shown in FIG. 7, the resilient member 16 is preferably connected to the transverse leaf spring 2 in a materially integral manner, for example, by of adhesive bonding or vulcanization of the resilient member 16 on the transverse leaf spring 2. In particular, the resilient member 16 may be arranged only at the upper side 12 of the transverse leaf spring 2 facing the support 17, as can be seen in FIG. 9.

As seen in FIGS. 8 and 9, the vehicle-side support 17 in the disclosed example of the wheel suspension 15 is an oval or cylindrical pin which is completely received in a corresponding recess of the resilient member 16. In this manner, the resilient member 16 and the oval or cylindrical pin 17 form an articulated engagement enabling pivotal movement of the two engaged elements 16 and 17 relative to each other. The pivot axis 14 of this articulated engagement extends parallel with the main bending axis of the transverse leaf spring 2 which, also extends parallel with the vehicle longitudinal axis 3.

The oval or cylindrical pin 17 is securely connected to the vehicle superstructure or to the auxiliary frame 7 which is connected to the vehicle superstructure. The oval or cylindrical pin 17 is, in comparison with the material of the resilient member 16, formed from a rigid or hard material, such as, for example, steel, aluminum or another metal or a correspondingly hard plastics material. The pin 17 which is formed from the hard material ensures a desirably high level of vertical rigidity of the articulated engagement, while the resilience of the articulated engagement in a lateral direction can be predetermined by the special configuration of the resilient member 16. Furthermore, the spacing of the pivot axis 14 with respect to the upper side 12 of the transverse leaf spring 2 can also be readily optimized by corresponding configuration of the resilient member 16 taking into account the movements of the transverse leaf spring 2 occurring during travel operation. In this manner, the desired dynamic behavior of the wheel suspension 15 according to the invention can be influenced in the desired manner by of the inner articulation locations 4 of the transverse leaf spring 2.

With respect to the wheel suspension 9 described above, the wheel suspension 15 affords the additional advantage that the articulated engagement can more readily follow the movements of the transverse leaf spring 2 during travel operation, that is to say, with less resistance. Since the resilient member 16 can rotate substantially freely about the received pin 17, the resilient member 16 is subjected to fewer deformations during the movements of the transverse leaf spring 2 during travel operation. The hysteresis of the wheel suspension according to the invention can thereby generally be reduced.

In order to further reduce the friction occurring between the resilient member 16 and the pin 17, in the embodiment of the wheel suspension 15 according to the invention illustrated in FIG. 7, there is additionally inserted into the recess of the resilient member 16 a bushing 18, in particular a metal or plastics bushing, as can be seen in FIG. 9. The oval or cylindrical pin 17 is received in this bushing 18. The hysteresis of the wheel suspension according to the invention can thereby again be reduced.

The above-described wheel suspension according to the invention for vehicles, in particular motor vehicles, is not limited to the embodiments disclosed herein, but instead also comprises other embodiments which have the same effect. In a preferred embodiment, the wheel suspension according to the invention having a transverse leaf spring which is arranged transversely relative to a vehicle longitudinal axis, is used in a vehicle, in particular a motor vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension comprising:
a vehicle having a longitudinal center plane defining two sides of the vehicle;
a transverse leaf spring arranged transversely relative to a vehicle longitudinal axis;
an auxiliary frame;
vehicle-side supports connected to said auxiliary frame;
resilient members connected to said transverse leaf spring in a materially integral manner, said resilient members and said vehicle side supports forming an articulated engagement wherein only one articulated engagement is provided at each of said two sides of the vehicle; and
each of said vehicle-side supports includes a cylindrical pin, each cylindrical pin completely received in a corresponding recess of a corresponding resilient member wherein each resilient member and corresponding cylindrical pin form an articulated engagement enabling pivotal movement of said resilient member and said cylindrical pin relative to each other.

2. The wheel suspension as set forth in claim 1 wherein the articulated engagement has at least one pivot axis extending parallel with a main bending axis of the transverse leaf spring.

3. The wheel suspension as set forth in claim 1 wherein a bushing is inserted into the recess of the resilient member and said cylindrical pin is located in and surrounded by said bushing.

4. The wheel suspension as set forth in claim 1 wherein said resilient members are arranged exclusively at an upper side of the transverse leaf spring facing said vehicle-side supports.

5. The wheel suspension as set forth in claim 1 wherein the transverse leaf spring includes a composite glass fiber material.

6. A wheel suspension comprising:
a vehicle having a longitudinal center plane defining first and second sides of said vehicle;
a leaf spring arranged transversely relative to a vehicle longitudinal axis;
an auxiliary frame;
first and second vehicle-side supports connected to said auxiliary frame;
first and second resilient members connected to said leaf spring in a materially integral manner, said first and second resilient members and said first and second vehicle-side supports forming a respective first and second articulated engagement wherein said first articulated engagement is located on said first side of said vehicle and said second articulated engagement is located on said second side of said vehicle; and
each of said first and second vehicle-side supports includes a cylindrical pin completely received in a corresponding recess of said corresponding first and second resilient members wherein each resilient member and corresponding cylindrical pin form an articulated engagement enabling pivotal movement of said resilient member and said cylindrical pin relative to each other.

7. The wheel suspension as set forth in claim 6 wherein said leaf spring has a main bending axis and said first and second articulated engagements each have at least one pivot axis that extends parallel to said main bending axis of said leaf spring.

8. The wheel suspension as set forth in claim 7, wherein said cylindrical pin of said first vehicle-side support forms a first pivot axis extending parallel to said main bending axis of said leaf spring and said cylindrical pin of said second vehicle-side support forms a second pivot axis extending parallel to said main bending axis of said leaf spring.

* * * * *